(12) United States Patent
Frantz et al.

(10) Patent No.: US 11,717,111 B2
(45) Date of Patent: Aug. 8, 2023

(54) CONTACT TOASTER INCLUDING INDEPENDENT COMPRESSIBLE GRIPPING MEMBERS

(71) Applicant: STEARNS PRODUCT DEVELOPMENT CORPORATION, Perris, CA (US)

(72) Inventors: Howard Jay Frantz, Irvine, CA (US); Steve Raio, Perris, CA (US)

(73) Assignee: STEARNS PRODUCT DEVELOPMENT CORPORATION, Perris, CA (US)

( * ) Notice: Subject to any disclaimer, the term of this patent is extended or adjusted under 35 U.S.C. 154(b) by 282 days.

(21) Appl. No.: 17/148,253

(22) Filed: Jan. 13, 2021

(65) Prior Publication Data

US 2021/0212517 A1    Jul. 15, 2021

Related U.S. Application Data

(60) Provisional application No. 62/995,068, filed on Jan. 13, 2020.

(51) Int. Cl.
*A47J 37/08* (2006.01)

(52) U.S. Cl.
CPC ....... *A47J 37/0857* (2013.01); *A47J 37/0864* (2013.01)

(58) Field of Classification Search
CPC .... A47J 37/044; A47J 37/0611; A47J 37/067; A47J 37/0704; A47J 37/08; A47J 37/0814; A47J 37/085; A47J 37/0857; A47J 37/0864; A47J 37/0871

USPC ......... 99/385, 386, 387, 390, 391, 393, 397, 99/423, 427, 443 R, 443 C, 448
See application file for complete search history.

(56) References Cited

U.S. PATENT DOCUMENTS

| | | | | |
|---|---|---|---|---|
| 3,126,813 A | * | 3/1964 | Marriott | A47J 37/0857 99/443 R |
| 4,530,276 A | | 7/1985 | Miller | |
| 5,983,785 A | * | 11/1999 | Schreiner | A47J 37/0857 99/386 |
| 6,736,051 B2 | | 5/2004 | Frantz et al. | |
| 11,337,554 B1 | * | 5/2022 | Frantz | A47J 37/0857 |
| 2003/0051605 A1 | * | 3/2003 | Frantz | A47J 37/0864 99/385 |
| 2010/0275789 A1 | | 11/2010 | Lee et al. | |

* cited by examiner

*Primary Examiner* — Hung D Nguyen
(74) *Attorney, Agent, or Firm* — Stetina Brunda Garred & Brucker

(57) ABSTRACT

A conveyorized contact toaster includes a toasting platen and a conveyer mechanism. The toasting platen includes a planar toasting surface. The conveyer mechanism is arranged in a loop and includes a bun interface portion and a return portion. The bun interface portion is in opposed relation to the planar toasting surface and comprises a base including a pair of lateral edges, and a plurality of gripping bodies extending from the base. The gripping bodies may be resilient and independently compressible. The plurality of gripping bodies are positioned along a plurality of gripping axes, with each gripping axis extending orthogonal to the pair of lateral edges and having at least two of the plurality of gripping bodies residing thereon.

20 Claims, 7 Drawing Sheets

CONTACT TOASTER INCLUDING INDEPENDENT COMPRESSIBLE GRIPPING MEMBERS

CROSS-REFERENCE TO RELATED APPLICATIONS

This application claims the benefit of U.S. Provisional Application Ser. No. 62/995,068, filed Jan. 13, 2020, the contents of which are expressly incorporated herein by reference.

STATEMENT RE: FEDERALLY SPONSORED RESEARCH/DEVELOPMENT

Not Applicable

BACKGROUND

1. Technical Field

The present disclosure relates generally to toasters, and more specifically to conveyorized contact toasters having a plurality of independently compressible resilient gripping elements capable of accommodating buns that vary in thickness.

2. Description of the Related Art

There are two primary techniques for toasting bread: radiation and conduction. Radiant toasters are primarily used for toasting sliced bread, muffins, and bagels. Conventional radiant toasters include one or more heat elements positioned to toast one or both sides of the bread. The radiant emissions tend to penetrate the bread to create a crunchy, deep toasted layer. Radiant toasters may be static, such as the typical household toaster, or dynamic, such as a toaster having rotating conveyers, commonly used in restaurants.

Contact toasters are commonly used for toasting burger buns in many quick-service restaurants. Rather than creating a deep, crunchy toast, contact toasters typically create a thin, caramelized layer that may serve as a barrier or impediment to moisture or sauces from penetrating into the bun to prevent sogginess. Many contact toasters are vertically oriented and configured to allow for insertion of the bun from the top, with the bun exiting the toaster from the bottom after having been toasted. In many contact toasters, a rotating conveyer moves a bun across a hot platen to allow the heat from the platen to toast the bun. The rotating conveyer is spaced from the hot platen by a gap to accommodate the thickness of the bun.

In the past, many restaurants used to use one bun size on all of the hamburgers and cheeseburgers offered by the restaurant. However, over time, restaurants began to offer standard burgers, as well as premium burgers associated with thicker buns. The proliferation of various bun sizes has become common in the restaurant industry, which has led to several manners of dealing with the variations of bun thickness in terms of toasting the buns.

One particular manner of dealing with variable bun thickness is to utilize a single gap setting across all bun thicknesses. In particular, the gap between the conveyer and the platen is set to one thickness and is used for all bun types and thicknesses. This usually involves a compromise as thicker buns may be more compressed when passing through the toaster, while thinner buns may receive only minor compression. The amount of compression may impact the rate of heat transfer and the resultant quality of the toasted bun. Accordingly, adopting a single gap setting may result in an undesirable variable toast quality depending on the thickness of the bun.

Another manner of dealing with the variable bun thickness is to continually reset the gap to accommodate buns of different thickness. While continual resetting of the gap may provide optimal gap sizing for each bun, it is oftentimes impractical to customize the gap for each bun. Typically, buns are toasted to order, and thus, one particular order may include buns of several different thicknesses. Any restaurant with a high volume of food orders may not be able to customize the gap size for each bun.

Yet another manner of dealing with variable bun thickness is to have a separate toaster for each bun type, with each toaster having a unique gap size. However, the bun toaster may be a part of a highly engineered production line, where space on the line is precious. Furthermore, the toasters may be associated with high cost, and thus, adding toasters may not be a practical solution.

Accordingly, there is a need in the art for a contact toaster than can accommodate buns that vary in thickness. Various aspects of the present disclosure address this particular need, as will be discussed in more detail below.

BRIEF SUMMARY

In accordance with one embodiment of the present disclosure, there is provided a conveyorized contact toaster comprising a toasting platen and a conveyer mechanism. The toasting platen includes a planar toasting surface. The conveyer mechanism is arranged in a loop and includes a bun interface portion and a return portion. The bun interface portion is in juxtaposed to the planar toasting surface. The bun interface and return portions share a common a base including a pair of lateral edges, and further include a plurality of gripping bodies extending from the base. The plurality of gripping bodies are positioned along a plurality of gripping axes, with each gripping axis extending orthogonal to the pair of lateral edges and having at least two of the plurality of gripping bodies residing thereon.

Each gripping body may extend from the base and at least partially define an opening. Each gripping body may include a first end coupled to the base, a second end coupled to the base in spaced relation to the first end, and a middle portion between the first and second ends and extending away from the base to at least partially define the opening.

The plurality of gripping axes may include a first gripping axis and a second gripping axis, with the gripping bodies on the first gripping axis being offset from the gripping bodies on the second gripping axis in a direction parallel to the gripping axes.

The plurality of gripping axes may include a first gripping axis and a second gripping axis, the gripping bodies on the first gripping axis may be aligned with the gripping bodies on the second gripping axis along respective axes perpendicular to the gripping axes.

Each gripping body may include a fin protruding from the conveyer mechanism, the fin having a pair of opposed primary faces defining a fin depth therebetween and a pair of opposed side faces defining a fin width therebetween, the fin width being greater than the fin depth.

Each gripping body may include a nub having a round distal end portion extending away from the base.

Each gripping body may include a bristle having a narrow distal end portion extending away from the conveyer mechanism.

Each gripping body may be formed of a resilient material. The base may be a belt.

According to another embodiment, there is provided a method of heating a bun. The method includes applying pressure to the bun against a planar toasting surface of a toasting platen. The pressure is applied by a conveyer mechanism arranged in a loop having a bun interface portion and a return portion. The bun interface portion is in opposed relation to the planar toasting surface and includes a base including a pair of lateral edges, and a plurality of gripping bodies extending from the base. The pair of gripping bodies are positioned along a plurality of gripping axes, with each gripping axis extending orthogonal to the pair of lateral edges and having at least two of the plurality of gripping bodies residing thereon. The method may additionally include the step of urging the bun in an axial direction over the planar toasting surface.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

Figure 1:
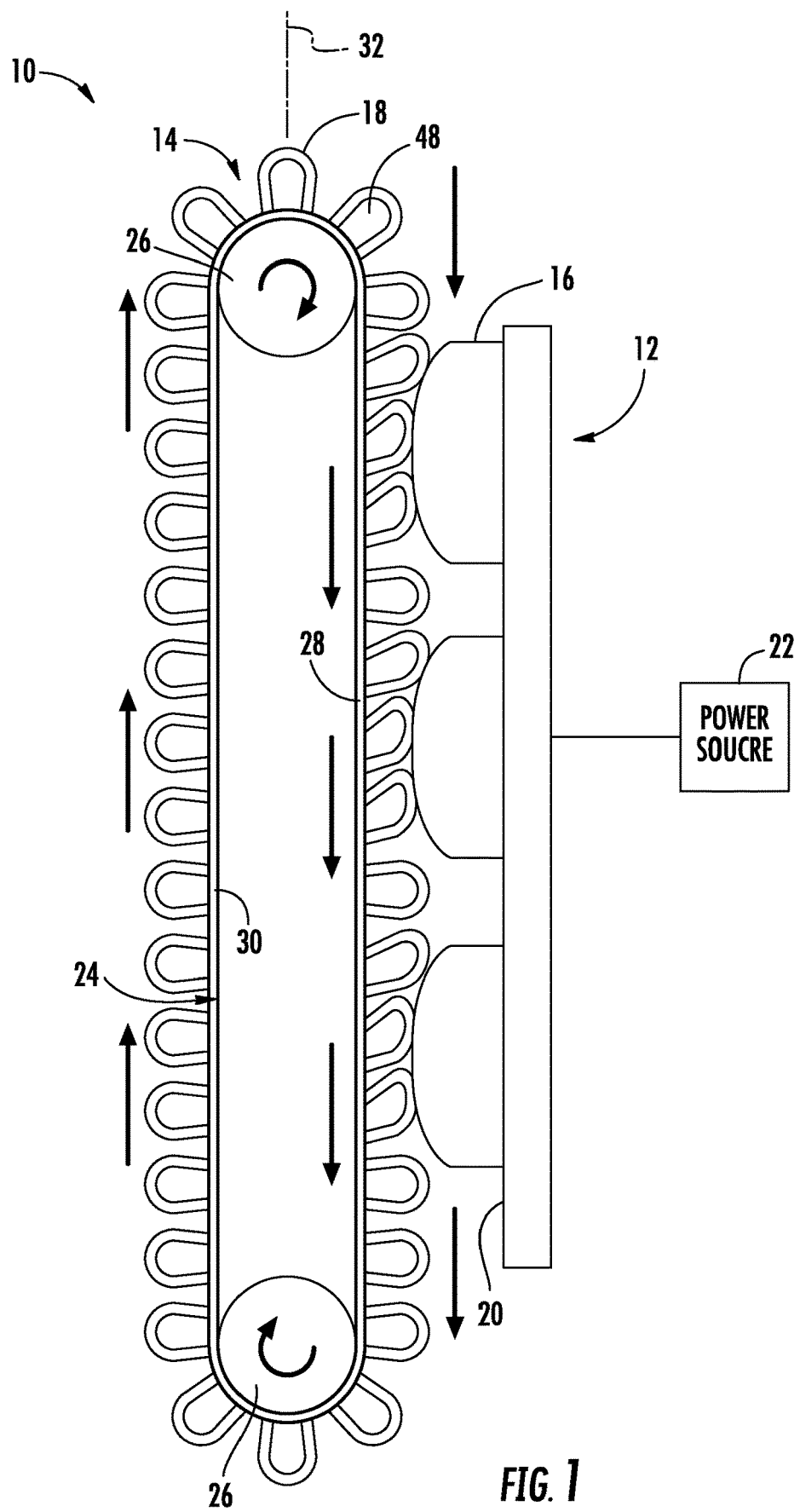
FIG. 1 is a side view of a conveyorized contact toaster having looped gripping elements for pressing and moving a bun along a toasting surface.
Figure 2:
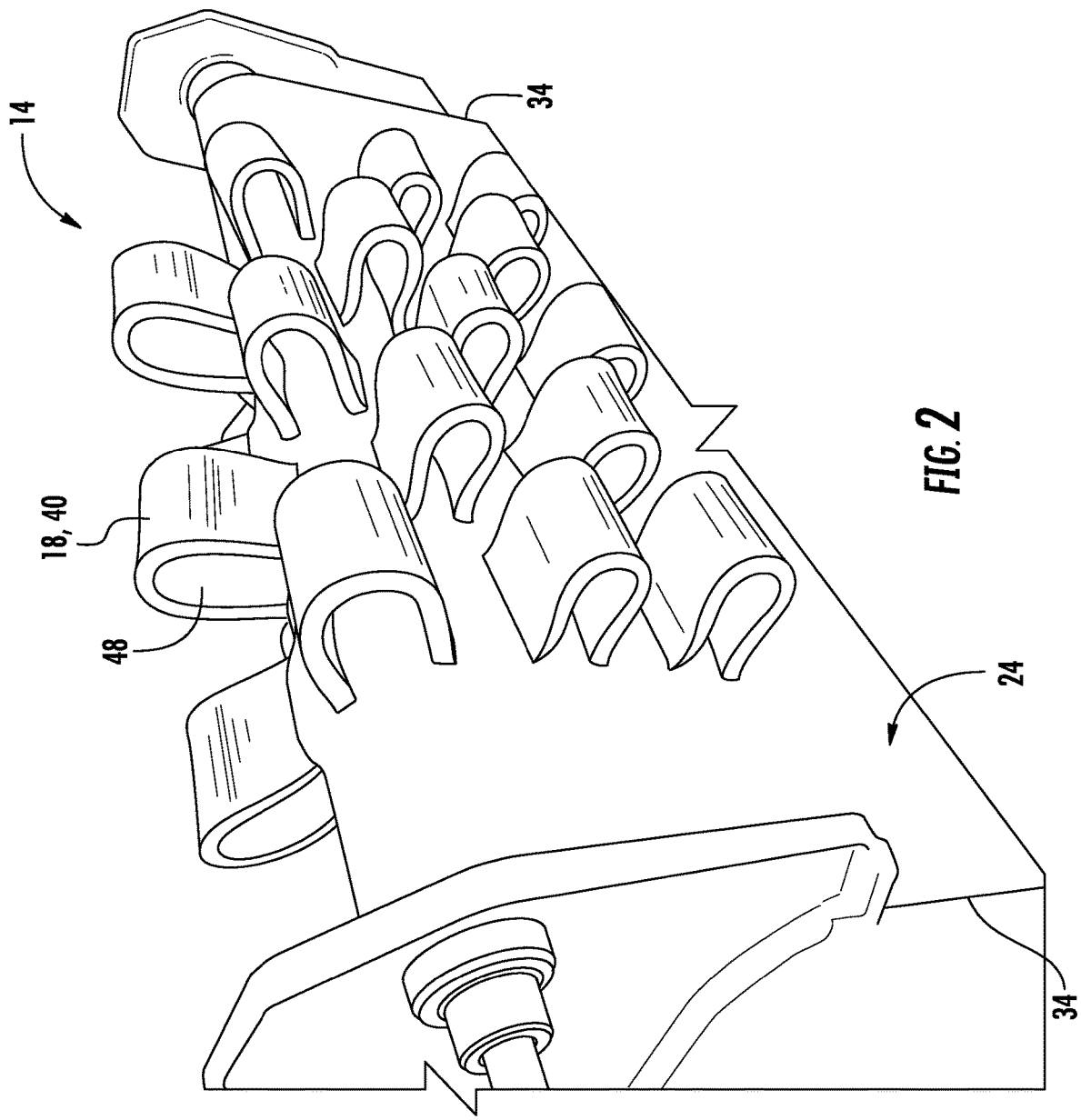
FIG. 2 is a partial upper perspective view of a conveying mechanism included in the conveyorized contact toaster of FIG. 1.

The detailed description set forth below in connection with the appended drawings is intended as a description of certain embodiments of a conveyorized contact toaster and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Referring now to the drawings, wherein the showings are for purposes of illustrating a preferred embodiment of the present disclosure, and are not for purposes of limiting the same, there is depicted a conveyorized contact toaster 10 that produces excellent toast across a range of bun thicknesses within the stringent demands of a restaurant environment. The contact toaster 10 is generally comprised of a toasting platen 12 and a conveyer mechanism 14. The toaster 10 is configured to receive hamburger bun halves ("buns") 16 between the conveyer mechanism 14 and the toasting platen 12 to toast the buns 16. The conveyer mechanism 14 includes a plurality of resilient gripping bodies 18 arranged in a prescribed pattern and configured to engage with the bun 16. The gripping bodies 18 are independently compressible to automatically adjust to the thickness of the bun 16 to apply sufficient pressure on the bun 16 for achieving desired toasting of the bun 16 by the toasting platen 12. Engagement between the gripping bodies 18 and the bun 16 also results in the bun 16 being dragged along the platen 12 from an upper end portion to a lower end portion. The configuration and resiliency of the gripping bodies 18 may accommodate buns 16 that vary in thickness, rather than relying on a one size fits all approach. In this regard, the toaster 10 may not require adjustment or resizing the distance separating the platen 12 and the conveyor belt 24 (described below) when toasting buns 16 having different thickness. Therefore, the toaster 10 may be capable of generating higher throughput than conventional toasters while at the same time providing more consistent bun toast across all bun thicknesses. Though the bun 16 is described above as being a "hamburger" bun, those of ordinary skill in the art will recognize that the toaster 10 as outfitted with those unique structural features described in more detail below may be adapted for use in conjunction with different food products for which toasting on one surface may be desirable, e.g., hot dog buns, bagels, tortillas, other non-bread products, etc.

FIG. 1 is a side view of the toaster 10 showing three bun halves 16 positioned between the toasting platen 12 and the conveying mechanism 14. It is contemplated that the toaster 10 may include a housing, though in FIG. 1 the same has been removed for clarity. The toasting platen 12 includes a planar toasting surface 20 which may be heated to toast that surface of each of the buns 16 which is in direct, abutting contact therewith. The toasting surface 20 may include a Teflon™ exterior to allow each bun 16 to slide smoothly over the toasting surface 20. The toasting platen 12 may be connected to an electrical power source 22, such as an electrical outlet or a battery to provide the power that may be required to heat the toasting surface 20.

The conveyer mechanism 14 may include the conveyer belt 24 (e.g., a base), a spaced pair of pulleys 26, and the plurality of gripping bodies 18 connected to the conveyer belt 24. The conveyer belt 24 may be arranged in a loop around the pulleys 26. At any point in its rotational position, the conveyor belt 24 will define both a bun interface portion 28 and a return portion 30. The pulleys 26 may be positioned in opposed relation to each other in a vertical orientation, e.g., vertically spaced apart from each other and aligned along a common vertical axis 32. Each pulley 26 may rotate about a respective rotational axis in a similar rotational direction. From the perspective shown in FIG. 1, the pulleys 26 rotate in a clockwise direction to impart the desired motion of the conveyer belt 24 to move the buns 16 from the top of the toasting surface 20 to the bottom of the toasting surface 20. Rotation of the pulleys 26 may be set to achieve a desired speed of bun travel over the toasting surface 20.

The conveyer belt 24 may include an opposed pair of lateral edges 34 and may be connected to the pulleys 26 to assume a looped configuration or profile as indicated above. The pulleys 26 may be spaced to create sufficient tension within the conveyer belt 24. As also indicated above, the conveyer belt 24 is arranged relative to the toasting platen 12 such that any given point during its rotation, a portion of the conveyer belt 24 defines the bun interface portion 28 and the return portion 30. The bun interface portion 28 is that portion of the conveyer belt 24 extending between the pulleys 26 in juxtaposed relation to the planer toasting surface 20, and the return portion 30 is that portion of the conveyer belt 24 extending between the pulleys 26 that is further spaced from the planer toasting surface 20 than the bun interface portion 28, i.e., the bun interface portion 28 resides between the outer return portion 30 and the toasting surface 20. From the perspective shown in FIG. 1, the bun interface portion 28 moves in a downward direction, while the outer return portion 30 moves in an upward direction. As will be readily recognized by those of ordinary skill in the art, during rotation of the conveyer belt 24 about the pulleys 26, any part of the bun interface portion 28 that rotates over the lower one of the two pulleys 26 transitions the return portion 30, while any part of the return portion 30 that rotates over the upper one of the two pulleys 26 transitions the bun interface portion 28.

The vertical orientation of the conveyer belt 24 may prevent the weight of the conveyer belt 24 from being used to create pressure on the bun 16. Certain conventional contact toasters are configured in a horizontal configuration, wherein the weight of the toaster is used to create pressure on the buns when toasting. Such conventional horizontal contact toasters tend to be very heavy to achieve sufficient pressure on the buns. The added weight tends to make the conventional toasters cumbersome and difficult to clean and maintain. In contrast, the toaster 10 may be configured such that pressure applied to the bun 16 may not be imparted by the weight of the conveyer mechanism, and instead, may be imparted by the resiliency and configuration of the gripping bodies 18. As such, the toaster 10 may be lighter, and easier to clean and maintain than conventional toasters.

Although the exemplary embodiment is configured in a vertical orientation, it is contemplated that other implementations of the toaster 10 are not limited thereto. In this regard, the conveyer belt 24 may be oriented at a 45-degree angle relative to a vertical axis, or alternatively, in a horizontal configuration, e.g., perpendicular to the force of gravity, or at any angle therebetween.

The plurality of gripping bodies 18 protrude or extend from the conveyer belt 24 and may be sized and configured such that at least one, and preferably multiple gripping bodies 18, will interface with any given bun 16 to evenly distribute the pressure applied to the bun 16. The gripping bodies 18 may be molded, formed or otherwise provided in any one of a multiplicity of different shapes and sizes. Along these lines, the gripping bodies 18 included on the conveyor belt 24 may all be of the same size and shape, or possibly provided in prescribed combinations of differing size and/or shape. Further, the gripping bodies 18 may be molded directly onto the conveyer belt 24 to minimize loose pieces or extra hardware, though they may alternatively comprise separate structures joined to the conveyor belt 24 through the use of a prescribed attachment modality (e.g., an adhesive). Each gripping body 18 may be compressible (and capable of resiliently returning to its uncompressed state) independent of the adjacent gripping bodies 18 to allow the gripping bodies 18 to conform to the bun 16, i.e., each gripping body 18 may be resilient to apply a gripping force on the bun 16 when the gripping body 18 engages with the bun 16 and is compressed by the bun 16. The independent, resilient compressibility may result in evenly distributed pressure on the bun 16 to achieve uniform toasting of the bun 16, regardless of the orientation of the conveyer belt 24. Another benefit is that even distribution of the pressure may result in greater preservation of bun integrity as the bun 16 passes through the toaster 10.

The gripping bodies 18 may be formed from a high temperature, FDA grade silicone, which may be very durable, yet lightweight. Silicone may be capable of withstanding heat, may be food-safe and easily cleanable, and is widely used in the food service industry. Silicone may also have sufficient internal resilience to generate a spring-like force when compressed. In this regard, the spring-like force may not be dependent on gravity and may be generated independent of the orientation of the toaster 10 (e.g., horizontal or vertical), which may allow for maximum flexibility in the design of the toaster 10.

Although silicone is explicitly mentioned as a possible material for the gripping bodies 18, it is contemplated that other suitable food-safe materials known by those skilled in the art may also be used to form the gripping bodies 18 without departing from the spirit and scope of the present disclosure.

Figure 3:
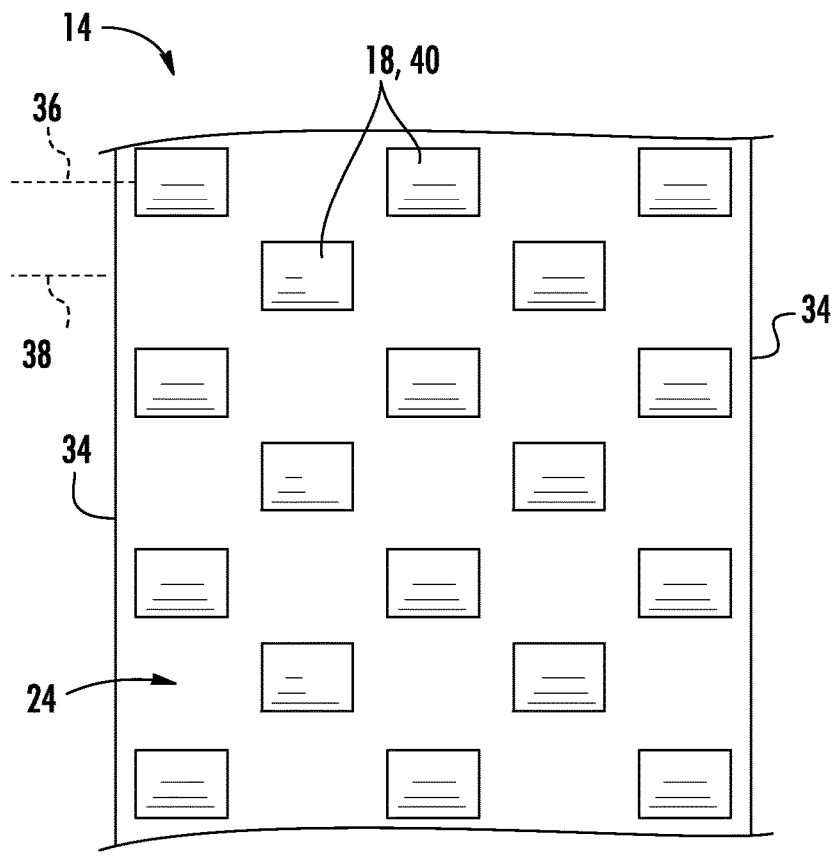
FIG. 3 is a partial front view of the conveying mechanism of FIG. 2.
Figure 4:
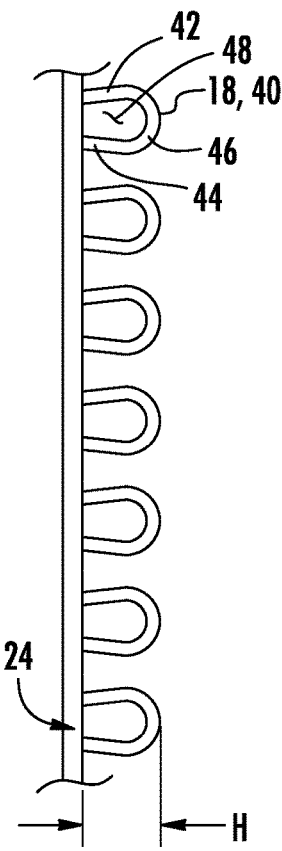
FIG. 4 is a partial side view of the conveying mechanism of FIG. 2.
Figure 5:
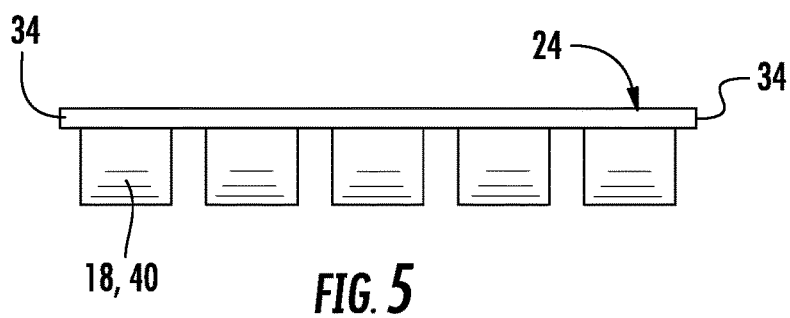
FIG. 5 is a top view of the conveying mechanism of FIG. 2.
Figure 6:
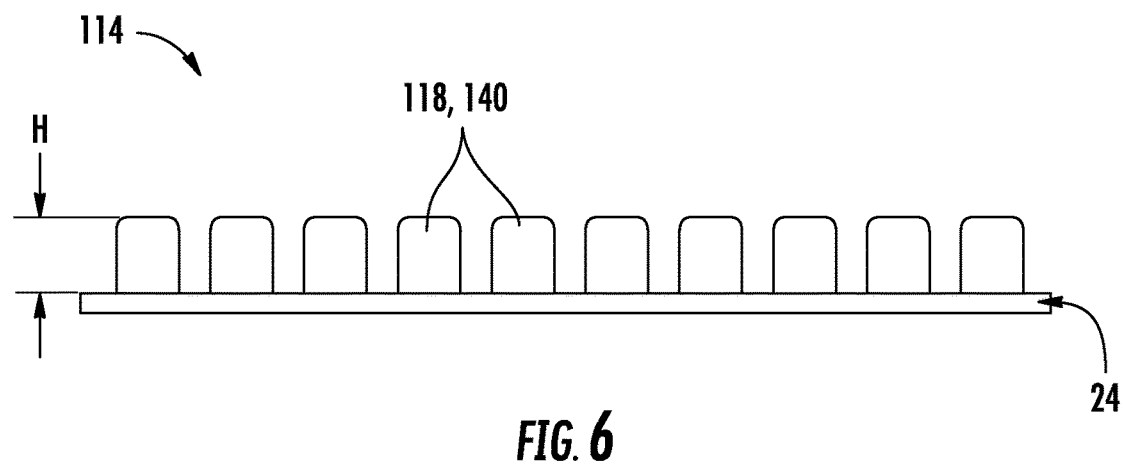
FIG. 6 is a top view of a second embodiment of the conveying mechanism including a plurality of fins as gripping elements.

According to one embodiment, the gripping bodies 18 are positioned along a plurality of gripping axes 36, 38, with each gripping axis 36, 38 extending orthogonal to the pair of lateral edges 34. Although FIG. 3 only explicitly identifies gripping axes 36, 38, it is understood that each row of gripping bodies 18 on FIG. 3 is associated with a respective gripping axis. One or more of the gripping axes 36, 38 may include multiple gripping bodies 18 residing thereon or aligned therewith, with those gripping bodies 18 residing any corresponding gripping axis 36, 38 being arranged in spaced relation to each other. Having multiple gripping axes 36, 38, etc., and multiple gripping bodies 18 on each gripping axis 36, 38 allows for automatic adjustment of the gripping bodies 18 to the unique contours and thicknesses of the buns 16 and provides uniform pressure against the bun 16. According to one embodiment, the width of each gripping body 18 (e.g., the dimension perpendicular to the lateral edges 34 of the conveyer belt 24) may be less than half of the width of the conveyer belt 24 (i.e., the distance between the lateral edges 34). In another embodiment, the width of each gripping body 18 is less than one-third or one-quarter of the width of the conveyer belt 24.

It is contemplated that the configuration and arrangement of the gripping bodies 18 may vary from one embodiment to the next. In the embodiment depicted in FIGS. 1-5, the gripping bodies 18 comprise loops 40 connected to or molded on the conveyer belt 24. In particular, each loop 40 may include a first end 42 coupled to the conveyer belt 24, a second end 44 coupled to the conveyer belt 24 in spaced relation to the first end 42, and a middle portion 46 between the first and second ends 42, 44 and extending away from the conveyer belt 24 to at least partially define an opening 48. In this regard, each loop 40 defines an opening 48, which may allow for flexion or bending of the loop 40 in response to engagement with the bun 16. It is contemplated that the exterior surface of the middle portion 46 of each loop 40 will define an apex, with the distance separating such apex from the conveyer belt 24 in turn defining the effective height H of each loop 40. It is further contemplated that the height H of all the loops 40 included on the conveyor belt 24 will be uniform, though they could be varied in some prescribed pattern or arrangement with departing from the spirit and scope of the present disclosure. Such height(s) H will also be selected to optimize the performance of the toaster 10, i.e., the efficacy/efficiency of the toasting procedure.

In the exemplary implementation shown in FIGS. 1-5, the arrangement of the loops 40 on the conveyer belt 24 are such that a first set of loops 40 aligned with the first gripping axis 36 are offset from a second set of loops 40 aligned with the second gripping axis 38. In particular, the offset between the first and second sets of loops 40 is in a direction parallel to the gripping axes 36, 38. In the embodiment depicted in FIG. 3, the loops 40 are arranged such that three loops 40 are aligned with the first gripping axis 36 and two loops 40 are aligned with the second gripping axis 38. The remaining loops 40 are also arranged in alternating sets of three loops 40 and two loops 40 along subsequent gripping axes. It is understood that the number of loops 40 aligned with a given gripping axis may vary without departing from the spirit and scope of the present disclosure. Also, the loops 40 need not necessarily be provided in the staggered arrangement described above and shown in FIGS. 2 and 3. Rather, using the perspective of FIG. 3 as a frame of reference, the loops 40 could potentially be provided in an arrangement wherein those disposed along any given gripping axis are vertically aligned with one on each of the gripping axes immediately above and below.

When a bun 16 is inserted into the toaster 10, the bun 16 may be inserted into the top of the toaster 10 between the conveyer mechanism 14 and the toasting surface 20, with the inside, flat surface of the bun 16 facing the toasting surface 20. The conveyer mechanism 14 may rotate to bring a plurality of gripping bodies 18, 40 into engagement with the bun 16. As each gripping body 18, 40 engages with the bun 16, the gripping body 18, 40 will become compressed to accommodate the thickness of the bun 16. The degree to which each gripping body 18, 40 is compressed will depend on the thickness of the bun 16. In greater detail, a thicker bun 16 will cause a greater degree of compression of the gripping body 18, 40 than a thinner bun 16. The compression of the gripping bodies 18, 40 imparts a pressure on the bun 16 against the toasting surface 20. As the conveyer belt 24 rotates, the gripping bodies 18, 40 drag the buns 16 along the toasting surface 20 from the top end portion toward the bottom end portion. As the bun 16 is dragged along the toasting surface 20, the portion of the bun 16 in direct contact with the toasting surface 20 becomes toasted. The bun 16 continues being dragged in the downward motion, until it passes the bottom edge of the toasting surface 20, wherein the bun 16 is released from being captured between the conveyer mechanism 14 and the toasting platen 12 and may fall to an underlying a basket or tray for retrieval.

As noted above, the gripping bodies 18 may be provided in a variety of shapes, configurations, and arrangements. FIGS. 6-15 show several alternative embodiments of the gripping bodies 18 that may be used in the toaster 10.

Referring now specifically to FIGS. 6-9, there is depicted a second embodiment of the conveyer mechanism 114, wherein each gripping body 118 includes a fin 140 protruding from the conveyer belt 24. The fins 140 may be molded onto the conveyor belt 24 or may constitute separate elements secured thereto via a suitable attachment modality, as indicated above. Each fin 140 may include a pair of opposed primary faces 141 defining a fin depth D therebetween and a pair of opposed side faces 143 defining a fin width W therebetween, with the fin width W being greater than the fin depth D. The fins 140 may be positioned on the conveyer belt 24 such that the primary faces 141 are extend generally perpendicular to the lateral edges 34, which may allow for easier deflection of the fins 140 in a direction parallel to the lateral edges 34 in response to engagement with a bun 16. It is contemplated that the distance separating the distal edge of each fin 140 (i.e., the edge disposed furthest from the conveyor belt 24) from the conveyor belt 24 will define the effective height H of each fin 140. It is further contemplated that the height H of all the fins 140 included on the conveyor belt 24 will be uniform, though they could be varied in some prescribed pattern or arrangement with departing from the spirit and scope of the present disclosure. Such height(s) H will also be selected to optimize the performance of the toaster 10, i.e., the efficacy/efficiency of the toasting procedure.

Figure 7:
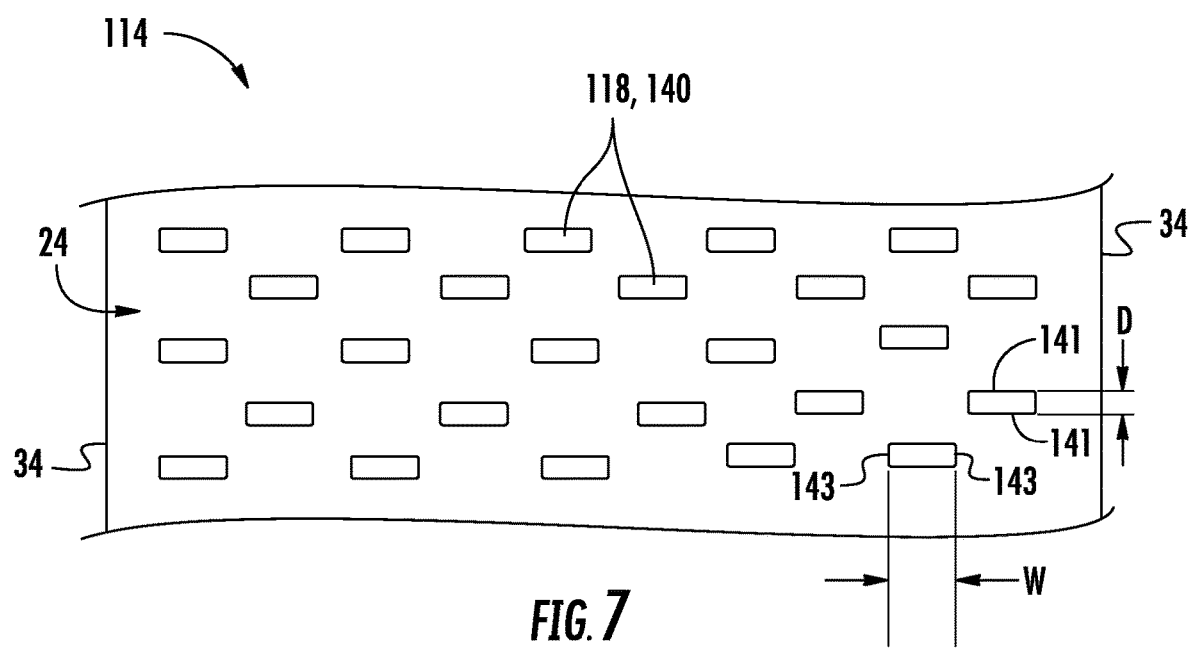
FIG. 7 is a partial front view of the conveying mechanism of FIG. 6.
Figure 8:
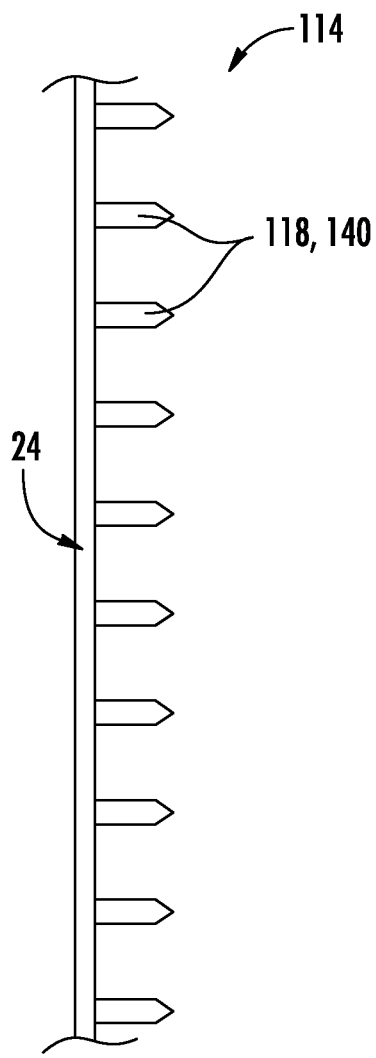
FIG. 8 is a partial side view of the conveying mechanism of FIG. 6.
Figure 9:
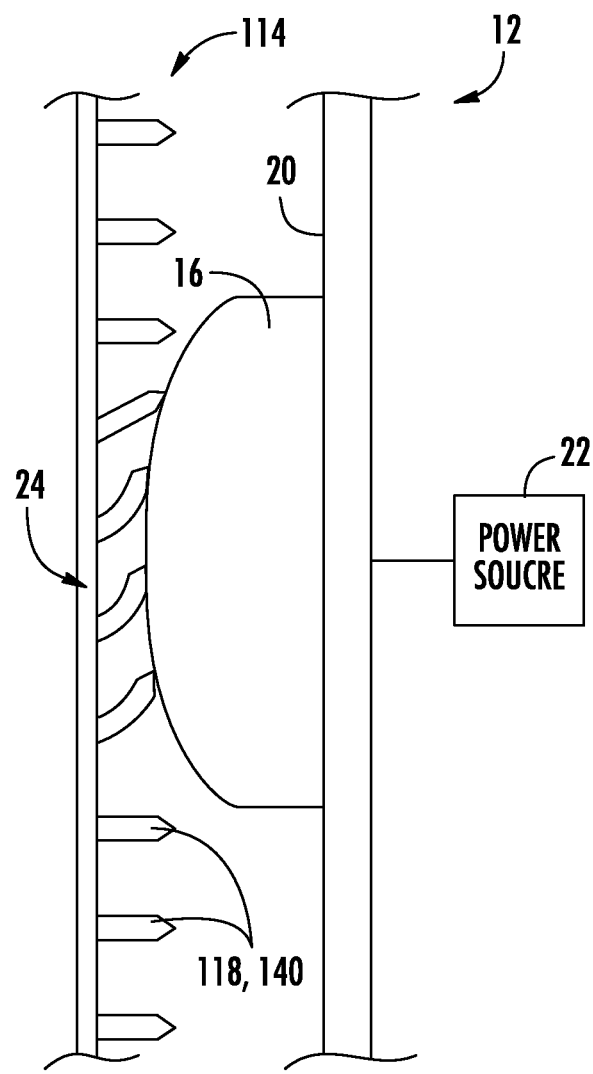
FIG. 9 is a partial side view of the conveyorized contact toaster having the conveying mechanism of FIG. 6 and as loaded with a bun.
Figure 10:
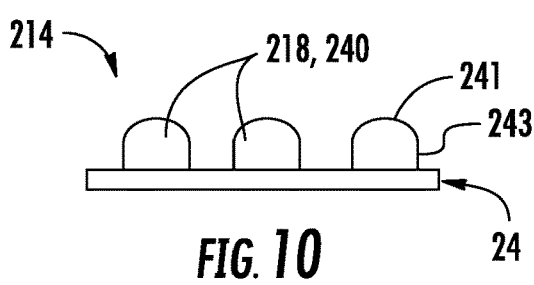
FIG. 10 is a top view of a third embodiment of the conveying mechanism including a plurality of nubs as gripping elements.
Figure 11:
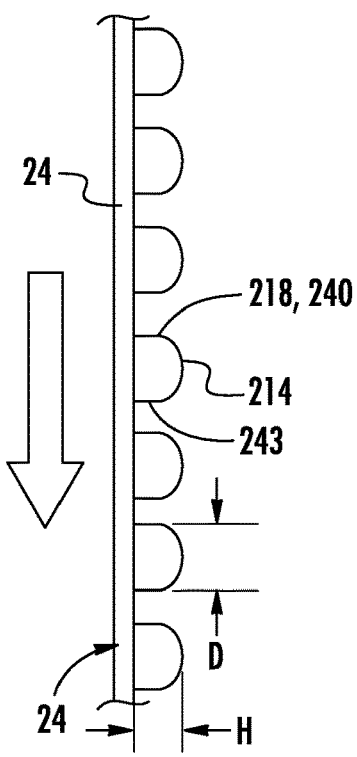
FIG. 11 is a partial side view of the conveying mechanism of FIG. 10.

The fins 140 shown in FIG. 7 are depicted in a staggered arrangement, wherein the fins 140 on one row are offset from the fins 140 of the adjacent rows. However, as with the loops 40, the fins 140 need not necessarily be provided in the staggered arrangement described above and shown in FIG. 7. Rather, using the perspective of FIG. 7 as a frame of reference, the fins 140 could potentially be provided in an arrangement wherein those disposed along any given horizontally extending gripping axis are vertically aligned with one on each of the gripping axes immediately above and below.

The fins 140 may be hollow to allow for easier compression when engaging with the bun 16, although it is understood that the fins 140 may also be solid without departing from the spirit and scope of the present disclosure.

Referring now to FIGS. 10-13, there is depicted a third embodiment of the conveyer mechanism 214, wherein each gripping body 218 may include a nub 240 having a round distal end portion 241 (e.g., a domed portion) disposed in spaced relation to the conveyer belt 24. A cylindrical intermediate portion 243 may extend between the conveyer belt 24 and the round distal end portion 241. The nubs 240 may be hollow to more easily allow for compression thereof during engagement with the bun 16, however, solid nubs 240 may also be used without departing from the spirit and scope of the present disclosure. In addition, those of ordinary skill in the art will recognize that each nub 240 may alternatively formed to be of a purer dome shape, i.e., essentially devoid of the intermediate portion 243. As with the loops 40 and fins 140 discussed above, the nubs 240 may be molded onto the conveyor belt 24 or may constitute separate elements secured thereto via a suitable attachment modality.

Figure 12:
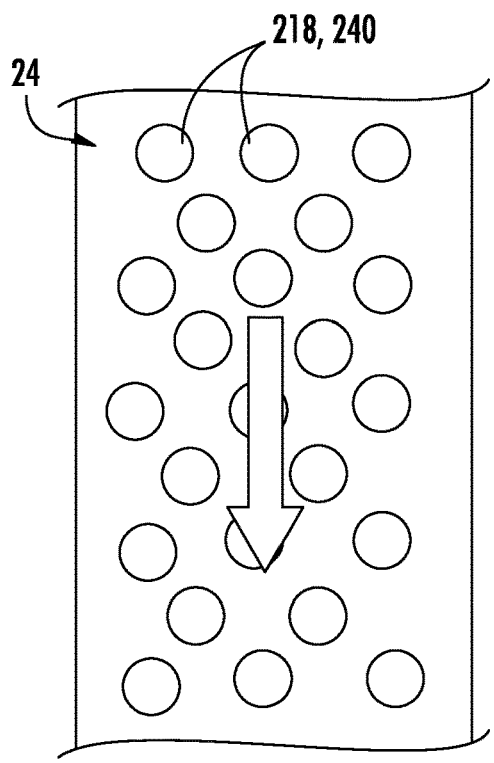
FIG. 12 is a partial front view of the conveying mechanism of FIG. 10.
Figure 13:
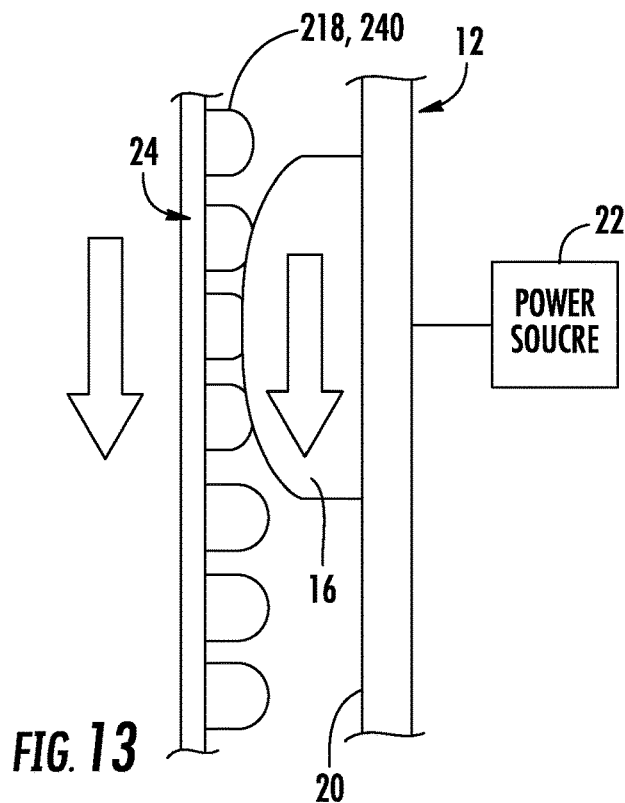
FIG. 13 is a partial side view of the conveyorized contact toaster having the conveying mechanism of FIG. 10 and as loaded with a bun.

Each nub 240 may be of a prescribed diameter D and a prescribed height H as defined by the distance separating the apex of the distal end portion 241 from the conveyor belt 24. It is further contemplated that the height H of all the nubs 240 included on the conveyor belt 24 will be uniform, though they could be varied in some prescribed pattern or arrangement with departing from the spirit and scope of the present disclosure. Such height(s) H will also be selected to optimize the performance of the toaster 10, i.e., the efficacy/efficiency of the toasting procedure. In addition, the nubs 140 shown in FIG. 12 are depicted in a staggered arrangement, wherein the nubs 240 on one row are offset from the nubs 240 of the adjacent rows. However, as with the loops 40 and the fins 140, the nubs 240 need not necessarily be provided in the staggered arrangement described above and shown in FIG. 12. Rather, using the perspective of FIG. 12 as a frame of reference, the nubs 240 could potentially be provided in an arrangement wherein those disposed along any given horizontally extending gripping axis are vertically aligned with one on each of the gripping axes immediately above and below.

Figure 16:
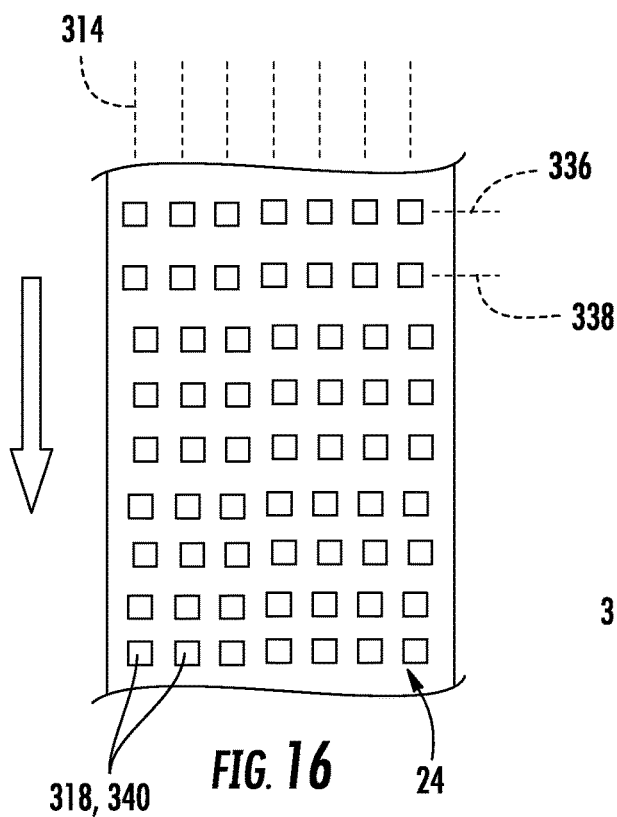
FIG. 16 is a partial front view of the conveying mechanism of FIG. 14.
Figure 17:
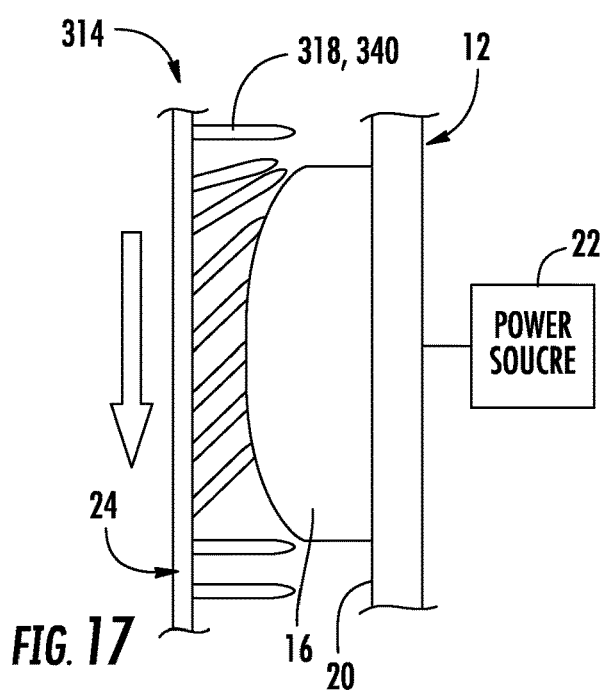
FIG. 17 is a partial side view of the conveyorized contact toaster having the conveying mechanism of FIG. 14 and as loaded with a bun.

Referring now to FIGS. 14-17, there is depicted a fourth embodiment of the conveyer mechanism 314, wherein each gripping body 318 includes a needle-like bristle 340 having a tapered distal end portion 341 which defines a distal tip disposed in spaced relation to the conveyor belt 24. The distal end portion 341 is comparatively narrower than the reminder of the bristle 340 extending to the conveyor belt 24. As shown in FIG. 16, that portion of each bristle 340 extending to the distal end portion 341 has a generally uniform cross-sectional configuration. As further shown in FIG. 16, that cross-sectional profile may be square, but may alternatively be provided in another form factor (e.g., circular, triangular, etc.). As with the loops 40, fins 140 and nubs 240 discussed above, the bristles 340 may be molded onto the conveyor belt 24 or may constitute separate elements secured thereto via a suitable attachment modality.

Figure 14:
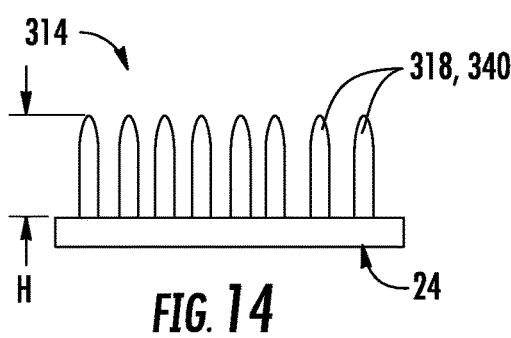
FIG. 14 is a top view of a fourth embodiment of the conveying mechanism including a plurality of bristles as gripping elements.
Figure 15:
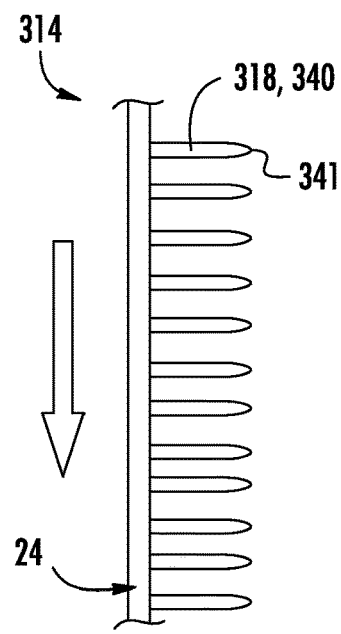
FIG. 15 is a partial side view of the conveying mechanism of FIG. 14.

Each bristle 340 may be of a prescribed height H as defined by the distance separating the distal end portion or tip 341 from the conveyor belt 24. It is further contemplated that the height H of all the bristles 340 included on the conveyor belt 24 will be uniform, though they could be varied in some prescribed pattern or arrangement with departing from the spirit and scope of the present disclosure. Such height(s) H will also be selected to optimize the performance of the toaster 10, i.e., the efficacy/efficiency of the toasting procedure. In addition, as shown in FIG. 14, The arrangement of the bristles 340 may be such that the bristles 340 on a first gripping axis 336 are aligned with the bristles 340 on a second gripping axis 338 along respective axes perpendicular to the gripping axes 336, 338. In other words, using the perspective of FIG. 14 as a frame of reference, the bristles 340 are provided in an arrangement wherein those disposed along any given horizontally extending gripping axis are vertically aligned with one on each of the gripping axes immediately above and below. However, the bristles 340 could potentially be provided in a staggered arrangement, wherein the bristles 340 on one row are offset from the bristles 340 of the adjacent rows, like the staggered arrangement of the loops 40, fins 140 and nubs 240 as shown in FIGS. 3, 7 and 12, and described above.

A common characteristic of all the gripping bodies described above is that each gripping body may be independently compressible and bendable relative to the other gripping bodies on the conveyer mechanism. Therefore, as the bun 16 engages with the conveyer mechanism, an outer surface of the bun 16 may have multiple gripping bodies in contact therewith, with each gripping body having assumed a different degree of compression and bending based on the particular thickness and contour of the bun 16. Those portions of the bun 16 that are greatest in thickness may cause a greater degree of compression and bending of the gripping bodies in contact therewith, while the portions of the bun 16 that have a minimum thickness may cause a lesser degree of compression and bending of the gripping bodies in contact therewith. For buns 16 that have an arcuate or domed outer surface, adjacent gripping bodies may be compressed and bent to different degrees to accommodate the arcuate contour, while providing sufficient pressure on the bun 16 to create generally uniform toasting of the bun 16.

The conveyorized contact toaster 10 described herein may be specifically configured and adapted for use within a highly constrained restaurant environment. In this regard, the toaster 10 may be durable and have minimal small parts that could fall into a customer's food. Furthermore, all materials used that could contact the food may be listed as food safe by the United States Food and Drug Administration (FDA), the National Sanitation Foundation (NSF) and the Underwriters' Laboratories (UL). The materials may be able to tolerate high ambient temperatures associated with the toasting process.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A conveyorized contact toaster comprising:
 a toasting platen having a planar toasting surface; and
 a conveyer mechanism arranged in a loop as results in the formation of a bun interface portion and a return portion which are disposed in opposed relation to each other, with the bun interface portion further being juxtaposed to the planar toasting surface;
 the bun interface and return portions being defined by a common sheet-like belt which includes a pair of lateral edges, and a plurality of resiliently flexible gripping bodies fixedly attached to and extending from the belt and being positioned along a plurality of gripping axes, each gripping axis extending orthogonal to the pair of lateral edges and having at least two of the plurality of gripping bodies residing thereon, the gripping bodies being shaped to move a food product along the toasting platen while exerting a prescribed level of pressure to the food product without damaging the same.

2. The conveyorized contact toaster of claim 1, wherein each gripping body extends from the belt and at least partially defines an opening.

3. The conveyorized contact toaster of claim 2, wherein each gripping body includes a first end coupled to the belt between the lateral edges thereof, a second end coupled to the belt between the lateral edges thereof in spaced relation to the first end, and a middle portion between the first and second ends and extending away from the belt to at least partially define the opening.

4. The conveyorized contact toaster of claim 1, wherein the plurality of gripping axes include a first gripping axis and a second gripping axis, the gripping bodies on the first gripping axis being offset from the gripping bodies on the second gripping axis in a direction parallel to the gripping axes.

5. The conveyorized contact toaster of claim 1, wherein the plurality of gripping axes include a first gripping axis and a second gripping axis, the gripping bodies on the first gripping axis are aligned with the gripping bodies on the second gripping axis along respective axes perpendicular to the gripping axes.

6. The conveyorized contact toaster of claim 1, wherein each gripping body includes a fin protruding from the belt, the fin having a pair of opposed primary faces defining a fin depth therebetween and a pair of opposed side faces defining a fin width therebetween, the fin width being greater than the fin depth.

7. The conveyorized contact toaster of claim 1, wherein each gripping body includes a nub having a round distal end portion extending away from the belt.

8. The conveyorized contact toaster of claim 1, wherein each gripping body includes a bristle having a narrow distal end portion extending away from the belt.

9. The conveyorized contact toaster of claim 1, wherein the conveyor mechanism comprises a vertically spaced pair of pulleys having the belt looped thereabout, with the belt and the toasting platen having like vertical orientations.

10. The conveyorized contact toaster of claim 1, wherein each gripping body is independently compressible relative to the remaining ones of the plurality of gripping bodies.

11. A conveyer mechanism for a conveyorized contact toaster including a toasting platen having a planar toasting surface, the conveyer mechanism comprising:
- a sheet-like belt arranged in a loop having a bun interface portion and a return portion, the bun interface portion being juxtaposed to the planar toasting surface and having a pair of lateral edges; and
- a plurality of resiliently flexible gripping bodies fixedly attached to and extending from the base and being positioned along a plurality of gripping axes, each gripping axis extending orthogonal to the pair of lateral edges and having at least two of the plurality of gripping bodies residing thereon, the gripping bodies being shaped to move a food product along the toasting platen while exerting a prescribed level of pressure to the food product without damaging the same.

12. The conveyer mechanism of claim 11, wherein each gripping body extends from the belt and at least partially defines an opening.

13. The conveyer mechanism of claim 12, wherein each gripping body includes a first end coupled to the belt between the lateral edges thereof, a second end coupled to the belt between the lateral edges thereof in spaced relation to the first end, and a middle portion between the first and second ends and extending away from the belt to at least partially define the opening.

14. The conveyer mechanism of claim 11, wherein the plurality of gripping axes include a first gripping axis and a second gripping axis, the gripping bodies on the first gripping axis being offset from the gripping bodies on the second gripping axis in a direction parallel to the gripping axes.

15. The conveyer mechanism of claim 11, wherein the plurality of gripping axes include a first gripping axis and a second gripping axis, the gripping bodies on the first gripping axis are aligned with the gripping bodies on the second gripping axis along respective axes perpendicular to the gripping axes.

16. The conveyer mechanism of claim 11, wherein each gripping body includes a fin protruding from the belt, the fin having a pair of opposed primary faces defining a fin depth therebetween and a pair of opposed side faces defining a fin width therebetween, the fin width being greater than the fin depth.

17. The conveyer mechanism of claim 11, wherein each gripping body includes a nub having a round distal end portion extending away from the belt.

18. The conveyer mechanism of claim 11, wherein each gripping body includes a bristle having a narrow distal end portion extending away from the belt.

19. The conveyer mechanism of claim 11, wherein the conveyor mechanism comprises a vertically spaced pair of pulleys having the belt looped thereabout, with the belt and the toasting platen having like vertical orientations.

20. A method of heating a bun, the method comprising the steps of:
- applying pressure to the bun against a planar toasting surface of a toasting platen, the pressure being applied by a conveyer mechanism arranged in a loop having:
  - a bun interface portion and a return portion, the bun interface portion being juxtaposed to the planar toasting surface and being defined by a sheet-like belt including a pair of lateral edges, and a plurality of resiliently flexible gripping bodies fixedly attached to and extending from the belt and being positioned along a plurality of gripping axes, each gripping axis extending orthogonal to the pair of lateral edges and having at least two of the plurality of gripping bodies residing thereon, the gripping bodies being shaped to move a food product along the toasting platen while exerting a prescribed level of pressure to the food product without damaging the same; and
- urging the bun in an axial direction over the planar toasting surface.

* * * * *